C. J. DEAN.
SPRING WHEEL.
APPLICATION FILED NOV. 17, 1911.

1,038,535.

Patented Sept. 17, 1912.

Witnesses.
D. H. Harper
Carl Schramm

Charles J. Dean  Inventor.
By  A. J. Sangster  Attorney

UNITED STATES PATENT OFFICE.

CHARLES J. DEAN, OF BLASDELL, NEW YORK.

SPRING-WHEEL.

1,038,535.  Specification of Letters Patent.  Patented Sept. 17, 1912.

Application filed November 17, 1911. Serial No. 660,757.

*To all whom it may concern:*

Be it known that I, CHARLES J. DEAN, a citizen of the United States, residing at Blasdell, in the county of Erie and State of New York, have invented certain new and useful Improvements in Spring-Wheels, of which the following is a specification.

This invention relates to improvements in spring vehicle wheels, and the principal object of the invention is to provide a comparatively simple, exceedingly strong and very durable wheel of this character in which the outer or tread rim will be so mounted and supported with respect to the inner portion of the wheel that it may move freely and easily under spring tension in a radial direction, and also in a limited degree circumferentially of said inner portion to prevent binding.

Figure 1:
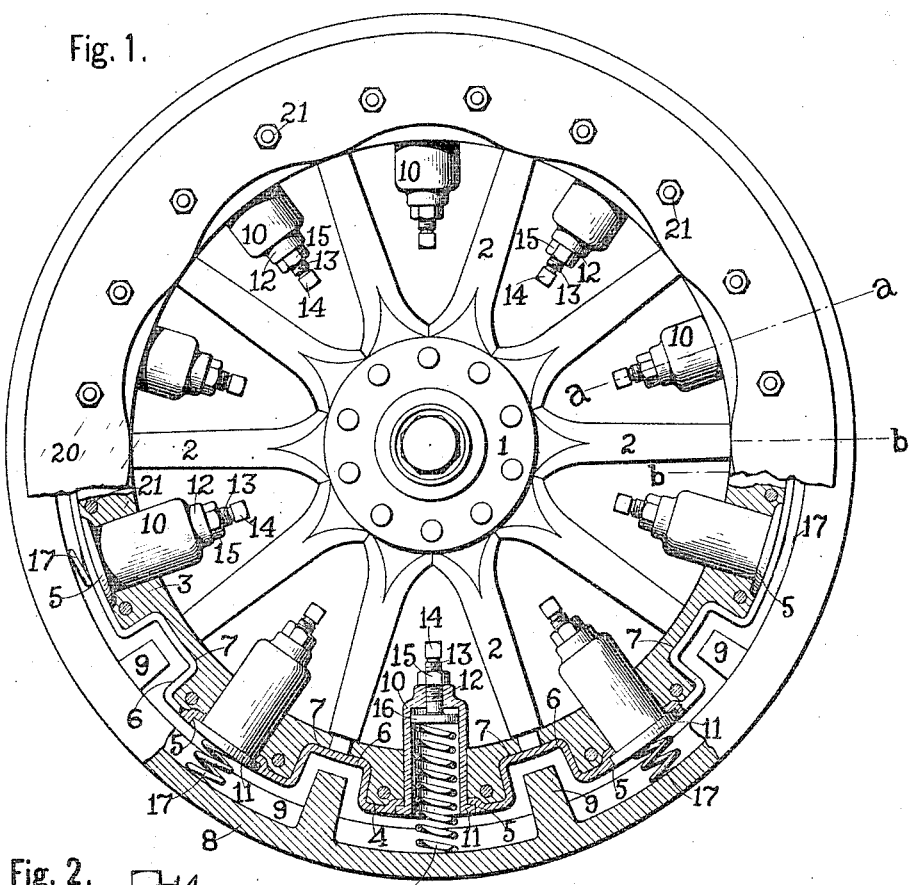
Figure 2:
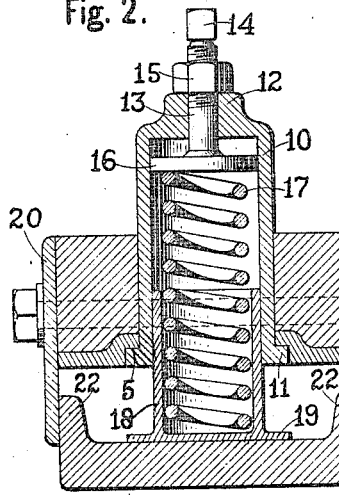
Figure 4:
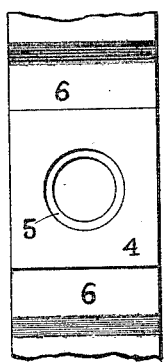
Figure 3:
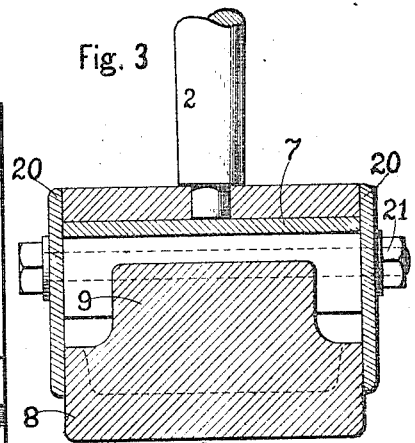

The invention also relates to certain details of construction which will be hereinafter described and claimed, reference being had to the accompanying drawings, in which:

Figure 1 is a side elevation partially in longitudinal section of the improved wheel. Fig. 2 is an enlarged radial section on line "a a", Fig. 1. Fig. 3 is an enlarged radial section on line "b b", Fig. 1, a fragment of one of the spokes also being shown in side elevation. Fig. 4 is a detached fragment of the recessed felly band.

In referring to the drawings in detail, like numerals designate like parts.

This improved spring wheel briefly consists of a hub 1, a series of spokes 2 arranged at equal intervals around, and extending radially out from the hub 1, a felly 3 arranged concentric with the hub to which the outer ends of the spokes are fastened, a recessed felly band surrounding the felly, an outer tread rim and a series of spring-tensioning devices mounted in the felly between the spokes and containing springs, the outer ends of which bear against the inner surface of the tread rim.

The felly is preferably constructed of wood and is provided with a series of radially extending circular openings arranged at equal intervals around its circumference, and an equal number of recesses or pockets on its exterior surface which are also arranged at equal intervals around the circumference, and are located in alternate order with respect to the circular openings. The pockets or recesses are preferably located directly in front of the outer ends of the spokes, as shown in Fig. 1, and are equal in number to said spokes and extend completely through the felly from side to side thereof.

A metal felly band 4 is fitted firmly and rigidly around the felly and is provided with a series of countersunk openings 5 which register with the circular openings in the felly, and a series of recesses or pockets 6 which fit in and form metal reinforcements for the recesses or pockets 7 in the felly, as shown in Fig. 1. These recesses or pockets also extend completely through the metal felly band from side to side thereof, as shown in Fig. 4. It will be noted that the outer end of each spoke abuts against the inner surface of the metal recess or pocket, so that the metal felly band is supported in contacting position with the spokes.

An outer tread rim 8 is fitted loosely around the felly, and is sufficiently large to provide an annular space between itself and the surface of the felly, as shown in Fig. 1. The outer tread rim 8 is provided with a series of inwardly extending radial projections 9 which are equal in number, and extend loosely within the pockets or recesses in the felly, and serve to prevent the rim turning independently of the felly, while at the same time permitting a certain limited range of circumferential movement to prevent binding. This is due to the fact that the pockets or recesses are made slightly longer than the projections 9 are wide.

In this improved wheel the hub, spokes and felly are of a rigid and unyielding character and the inequalities in the ground over which the wheel travels are taken up by the yieldingly mounted outer tread rim.

A series of tubular containers 10 are arranged in the circular openings in the felly and are each provided with a flange 11 at their outer ends to fit in the countersunk portion of said opening. Each of these tubular containers is formed substantially as shown in Fig. 2 and has its inner end closed by a head or cap 12 which is provided with a central screw-threaded opening in which an adjusting bolt 13 is mounted. The adjusting bolt is provided with a turning end 14 of the square or equivalent form, and a lock nut 15, and a disk 16 of circular form is arranged within the tubular container and in operation contacts with the bolt 13. The outer tread rim is yieldingly maintained with respect to the inner portion of the wheel by means of spiral springs 17 which are mounted within the tubular containers. As shown in Figs. 1 and 2, the tension of these springs may be regulated by adjusting the bolts 13. The outer end of each of these springs may be arranged to bear directly against the inner surface of the tread rim, as shown in Fig. 1, or a supplementary tubular inclosing member 18 may have its inner end telescoped within the container and its outer end closed by a flange cap 19 which bears against the inner surface of the tread rim, as shown in Fig. 2.

To prevent the lateral movement of the outer tread rim with respect to the remainder of the wheel, side flanges or face plates 20 are bolted to the opposite sides of the felly by a series of transversely extending bolts 21 which are fitted at intervals through the felly at points between the tubular containers and the spoke and the outer tread rim is provided with inwardly extending side flanges 22 which lap within the outer flange portions of the face plates 20, as shown in Fig. 3.

The pockets are considerably longer in the circumferential direction of the wheel than the projections 9 are thick, thereby permitting sufficient longitudinal movement of the projections 9 in the pockets to prevent binding. Transversely the pockets extend completely through the outer tread rim from side to side so that the outer tread rim can be quickly slipped on or removed from the felly when one of the face plates 20 is removed. It will be noted by referring to Fig. 1 that the pockets are in radial alinement with the spokes and are in fact located outside of the outer ends of the spokes. This immensely strengthens the structure as any abnormal strain upon the outer tread rim forcing the projections 9 into the bottom of the pockets will be transmitted in a direct longitudinal line against the spokes instead of at angles to the spokes.

In this improved construction the tubular containers for the springs are located in the felly between the spokes and have their inner ends projecting through the felly and extending a considerable distance within the felly. The advantage of this construction is that containers of considerable length may be used, thus permitting fairly long springs which support the outer tread rim so that it may yield freely and easily when in action.

In this improved wheel the spokes and felly are preferably constructed of wood and the hub, recessed felly band and the outer tread rim and tubular spring containers of suitable metal. While the outer tread rim is shown in the accompanying drawings as constructed of metal, it is obvious that it may be provided with an outer tread surface of rubber or other suitable material if it is so desired.

The chief advantages of this improved construction reside in the simple and strong means employed to prevent independent circumferential movement of the outer tread rim, in the arrangement of the tubular spring containers between the pockets, and in the general simplicity of the outer portion of the wheel.

I claim:

In a wheel of the class described, a felly provided with a series of exterior pockets which extend transversely and completely through the outer portion of the felly from side to side thereof and a series of openings arranged at intervals and located between the pockets which extend completely through the felly in a radial direction, an exterior tread rim loosely encircling the felly and having a series of inwardly extending projections which fit loosely in the exterior pockets, a metal felly band fitted rigidly around the felly and having complementary exterior pockets and radial openings, face plates attached to opposite sides of the felly and projecting on opposite sides of the tread rim, and a series of springs and spring-tensioning devices mounted in the radial openings and constructed and arranged to yieldingly support the outer tread rim with respect to said felly; said outer tread rim being adapted to be removed transversely from the felly upon the detachment of one of the face plates.

CHARLES J. DEAN.

Witnesses:
KATHERINE I. MITCHELL,
CARL SCHRAMM.